3,562,308
PROCESS FOR PRODUCING ORGANOMETALLIC CHELATED COBALT COMPLEXES
Giacomo Costa, Via Virgilio 17/1, and Giovanni Mestroni, Strada di Guardiella 10/1, both of Trieste, Italy
No Drawing. Filed July 22, 1968, Ser. No. 746,295
Claims priority, application Italy, July 25, 1967, 18,755/67
Int. Cl. C07j 15/06
U.S. Cl. 260—439                                             5 Claims

ABSTRACT OF THE DISCLOSURE

Process for preparing organometallic tetradentate complexes of cobalt by reacting a tetradentate cobalt complex having the formula:

$$\begin{array}{c} X' \quad Y \quad X'' \\ \diagdown | \diagup \\ Co \\ \diagup \quad \diagdown \\ X''' \qquad X'''' \end{array}$$

wherein $X'$, $X''$, $X'''$ and $X''''$, which may be the same or different, each represents an oxygen, nitrogen, phosphorus or sulphur atom with the proviso that all four are not nitrogen atoms, Y represents a hydrogen atom or an alkali metal atom with a hydrocarbon polyhalide, there being at least two molecules of the reactant cobalt complex for each molecule of the hydrocarbon polyhalide, so as to produce the desired polynuclear organometallic compound is disclosed. These compounds serve as useful intermediates for making effective organic cobalt catalysts.

---

This invention relates to a process for producing organometallic chelated cobalt complexes, and to the complexes produced thereby.

In our copending patent application, Ser. No. 705,891, filed Feb. 16, 1968, there is described and claimed a process for the preparation of addition compounds, which comprises reacting a hydride or an alkali metal salt of a polydentate chelated cobalt complex, having in its molecule a group having the following general formula:

$$\begin{array}{c} X' \quad Y \quad X'' \\ \diagdown | \diagup \\ Co \\ \diagup | \diagdown \\ X''' \quad B \quad X'''' \end{array}$$

wherein $X'$, $X''$, $X'''$ and $X''''$, which may be the same or different, each represent an oxygen, nitrogen, phosphorus or sulphur atom, with the proviso that all four may not be nitrogen atoms; Y represents a hydrogen atom or an alkali metal atom, and B represents a Lewis base, with inter alia an alkyl, aryl or cycloalkyl halide, an anhydride of an organic acid or a haloformate.

It has been now found that it is possible to add two or more hydride, or alkali metal salt, molecules of the cobalt complex to one molecule of a polyhalide compound.

According to the present invention there is provided a process for producing a polynuclear organometallic compound of a polydentate chelated cobalt complex, which comprises reacting a cobalt complex having in the molecule a group having one of the two following general formulae:

$$\begin{array}{c} X' \quad Y \quad X'' \\ \diagdown | \diagup \\ Co \\ \diagup | \diagdown \\ X''' \quad B \quad X'''' \end{array}$$

and $$\begin{array}{c} X' \quad Y \quad X'' \\ \diagdown | \diagup \\ Co \\ \diagup \quad \diagdown \\ X''' \qquad X'''' \end{array}$$

wherein $X'$, $X''$, $X'''$ and $X''''$, which may be the same or different, each represent an oxygen, nitrogen, phosphorus or sulphur atom with the proviso that all four are not nitrogen atoms, Y represents a hydrogen atom or an alkali metal atom, and B represents a Lewis base, with a hydrocarbon polyhalide, there being at least two molecules of the reactant cobalt complex for each molecule of the hydrocarbon polyhalide, so as to produce the desired polynuclear organometallic compound.

The process takes place in two steps: initially, one molecule of the cobalt compound is added to the polyhalide, with the elimination of one molecule of an alkali metal halide or hydrogen halide, and then the resulting organometallic compound which contains in its organic part at least one more halogen atom reacts with another complexed cobalt compound to produce a binuclear complex.

The cobalt compound produced by the process of the invention is useful for carrying out the reaction described in the above-mentioned copending application.

Any hydrocarbon polyhalide may be employed, but the best results are obtained with the gem-dihalo derivatives of the hydrocarbons.

Examples of suitable Lewis bases include water, an ether, amine or phosphine.

The invention will now be illustrated by the following example:

EXAMPLE 30 g. (about 0.1 mole) of NaCo (BAE) wherein BAE represents bis (acetylacetoneethylendiaminate) were reacted with 1.1 g. (about 0.05 mole) of 1,4 dibromobutane in a reaction medium consisting of tetrahydrofuran. A green solution was obtained which was treated with water and concentrated under vacuum to produce a crystalline green solid which was washed with acetone and recrystallized from $CH_2Cl_2$. The yield was 70%.

Analysis.—Calcd. (percent): C, 54.36; H, 7.17; N, 9.06. Found (percent): C, 54.44; H, 7.43; N, 9.02.

The melting point of the compound was 162° C.

What we claim is:

1. Process for producing an organometallic tetradentate complex of cobalt which comprises reacting a tetradentate cobalt complex having the formula:

$$\begin{array}{c} CH_3 \qquad\qquad\qquad CH_3 \\ | \qquad\qquad\qquad\qquad | \\ C \qquad\qquad\qquad\qquad C \\ \diagup\!\!\diagdown \qquad\qquad\qquad \diagup\!\!\diagdown \\ CH \quad O \quad Y \quad O \quad CH \\ \quad\;\; \diagdown | \diagup \\ \qquad\quad Co \\ \quad\;\; \diagup | \diagdown \\ C = N \qquad N = C \\ | \qquad | \qquad | \qquad | \\ CH_3 \;\; CH_2 - CH_2 \;\; CH_3 \end{array}$$

wherein Y is an alkali metal atom with an alkyl polyhalide, there being at least two molecules of the reactant cobalt complex for each molecule of the alkyl polyhalide, so as to produce the desired binuclear organometallic compound.

2. Process according to claim 1 wherein Y is sodium.

3. Process according to claim 1 wherein said alkyl polyhalide is 1,4-dibromobutane.

4. Process according to claim 1 wherein said alkyl polyhalide is an alkyl gem-dihalide.

5. Process according to claim 1 wherein said tetradentate cobalt complex is joined to a Lewis base selected from the group consisting of water, an amine, an ether and a phosphine.

References Cited

Costa et al.: J. Organomethal. Chem., 11 (1968), pp. 325–332.

TOBIAS E. LEVOW, Primary Examiner

A. P. DEMERS, Assistant Examiner

U.S. Cl. X.R.

252—431

UNITED STATES PATENT OFFICE
CERTIFICATE OF CORRECTION

PO-1050 (5/69)

Patent No. 3,562,308    Dated February 9, 1971

Inventor(s) Giacomo Costa et al.

It is certified that error appears in the above-identified patent and that said Letters Patent are hereby corrected as shown below:

Column 1, after the names of the inventors, insert --,assign to Snam Progetti, S.p.A., Milan, Italy--

Signed and sealed this 3rd day of April 1973.

(SEAL)
Attest:

EDWARD M. FLETCHER, JR.
Attesting Officer

ROBERT GOTTSCHALK
Commissioner of Pate